May 1, 1956 P. WINOKUR ET AL 2,743,827
SELF-SERVICE MARKET CONSTRUCTION
Filed Feb. 24, 1951 7 Sheets-Sheet 2
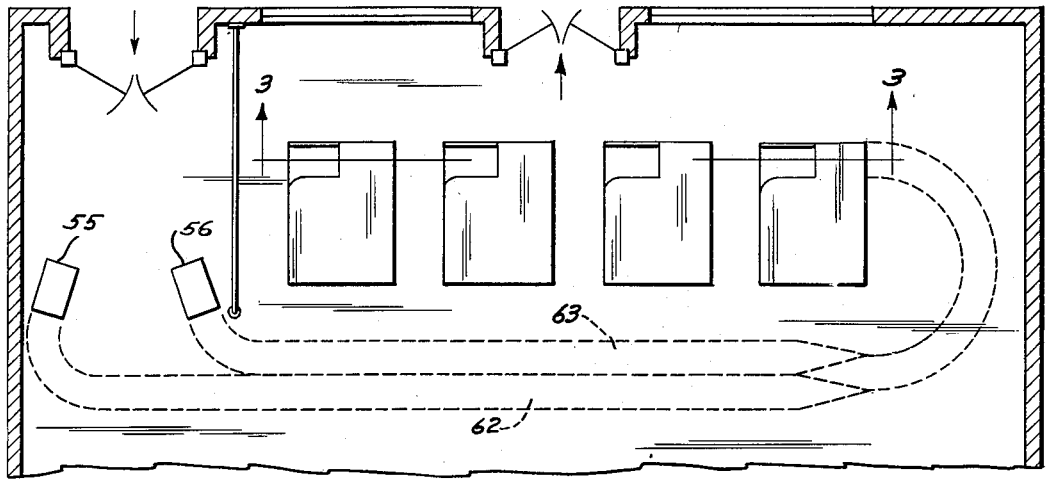
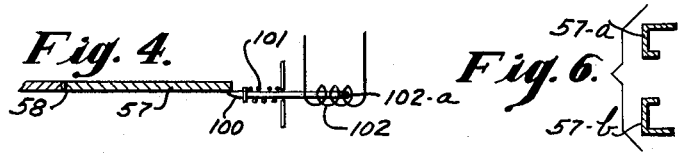
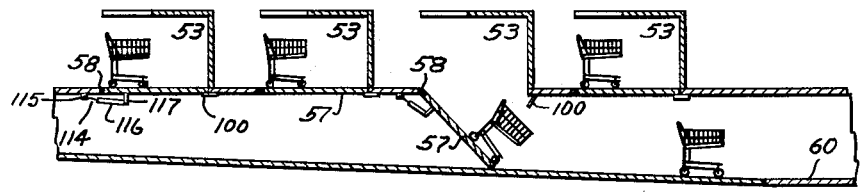
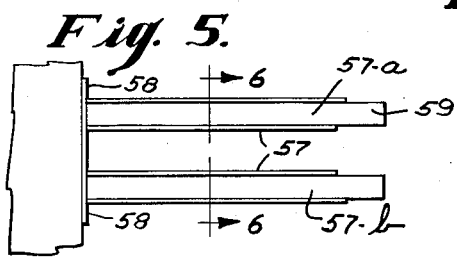
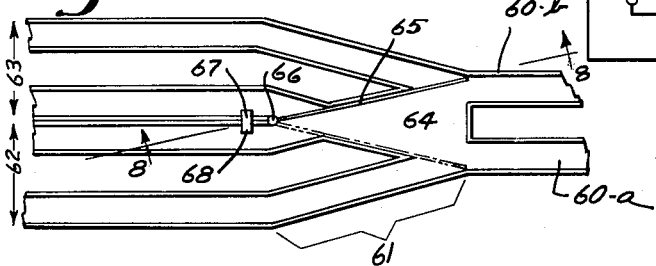
INVENTOR.
PETER WINOKUR, JR.
EDWIN J. ELLIS
BY
Leonard L. Kalish
ATTORNEY.

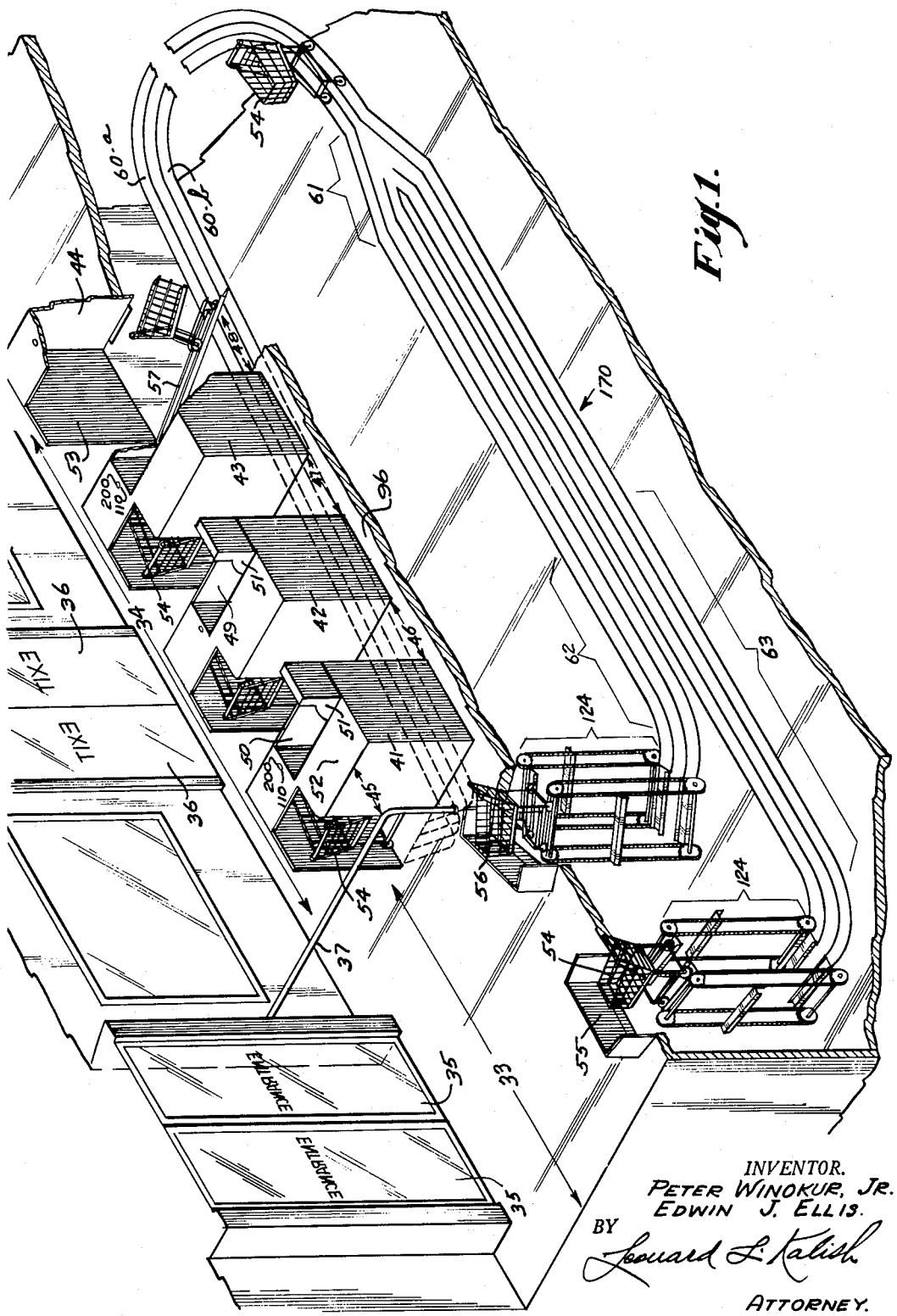

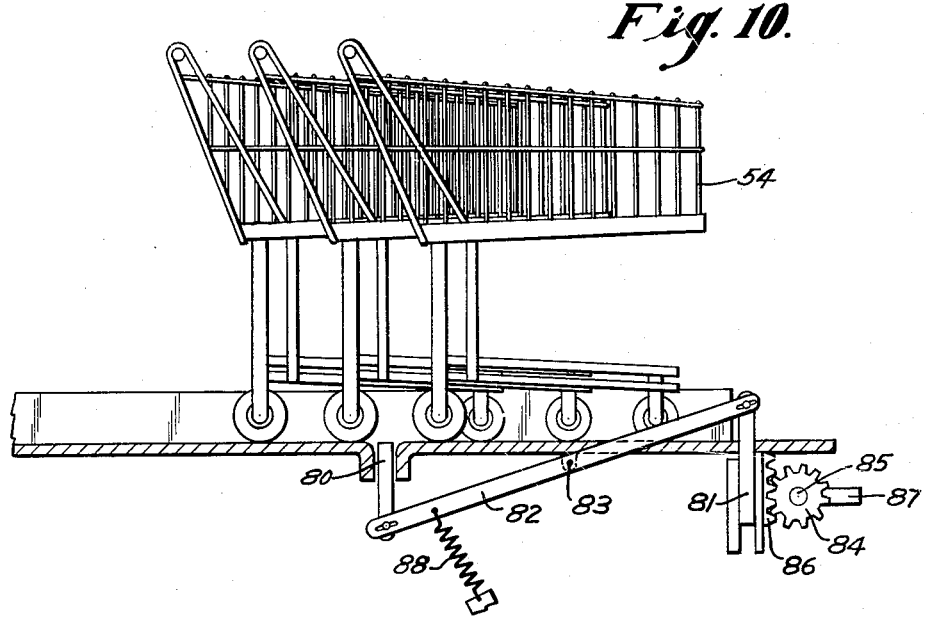
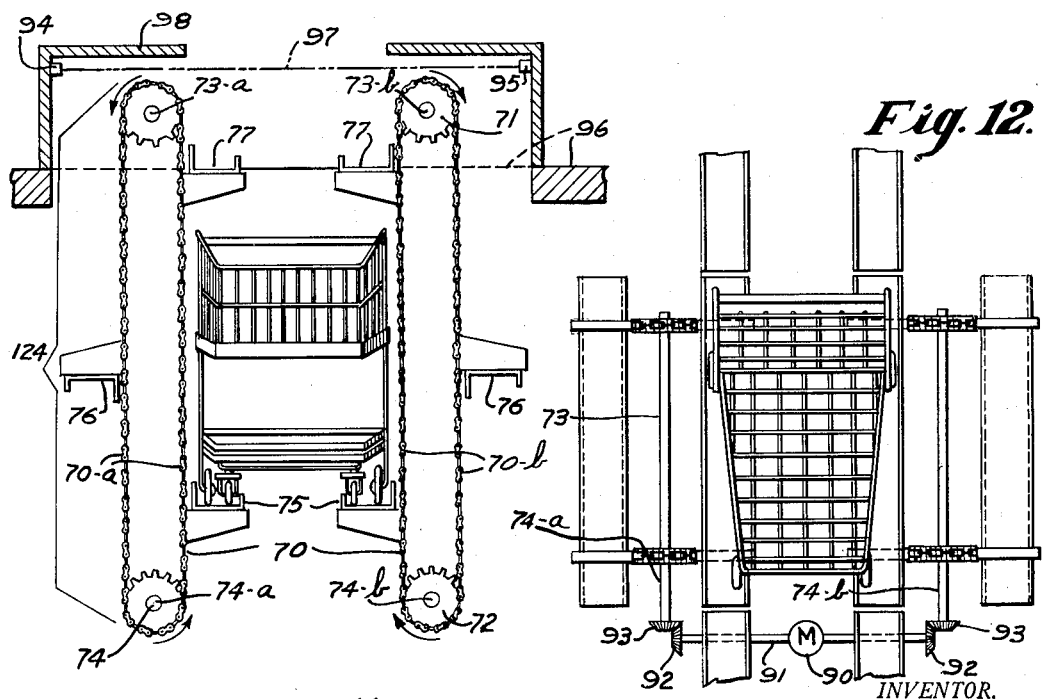

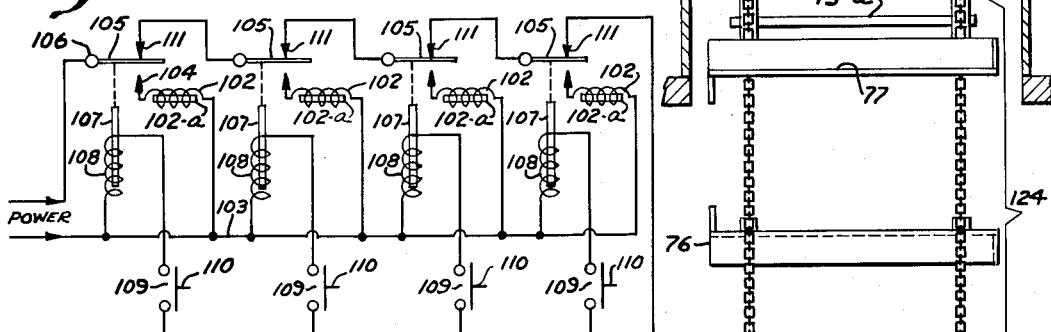
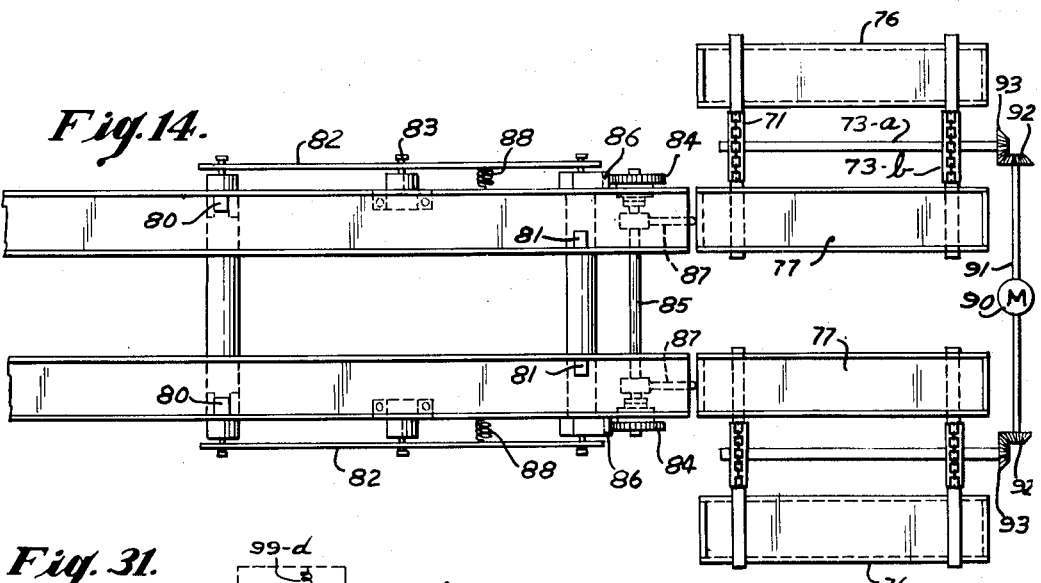
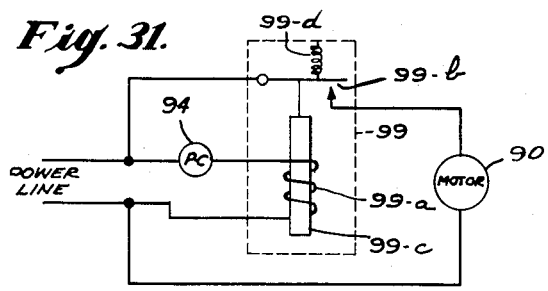

May 1, 1956 P. WINOKUR ET AL 2,743,827
SELF-SERVICE MARKET CONSTRUCTION
Filed Feb. 24, 1951 7 Sheets-Sheet 5

INVENTOR.
PETER WINOKUR, JR.
EDWIN J. ELLIS
BY
Leonard L. Kalish
ATTORNEY.

May 1, 1956  P. WINOKUR ET AL  2,743,827
SELF-SERVICE MARKET CONSTRUCTION
Filed Feb. 24, 1951  7 Sheets-Sheet 6

INVENTOR,
PETER WINOKUR, JR.
EDWIN J. ELLIS
BY Leonard L. Kalish
ATTORNEY.

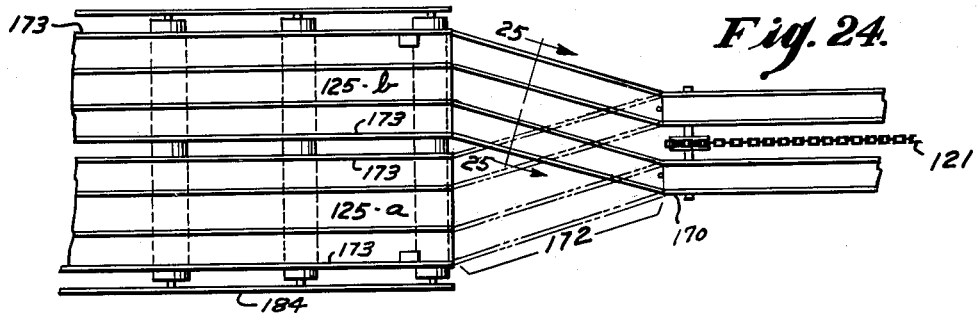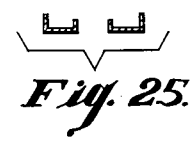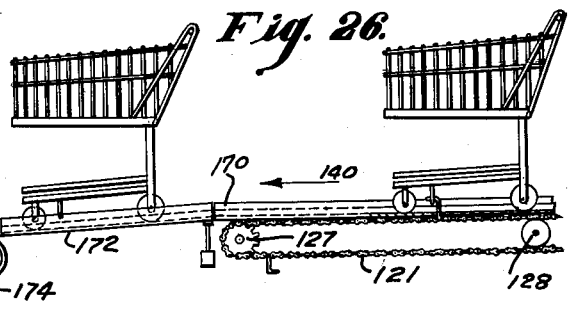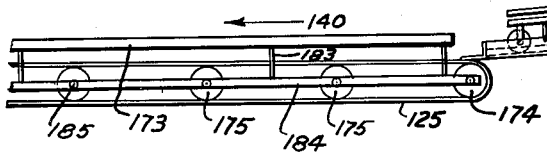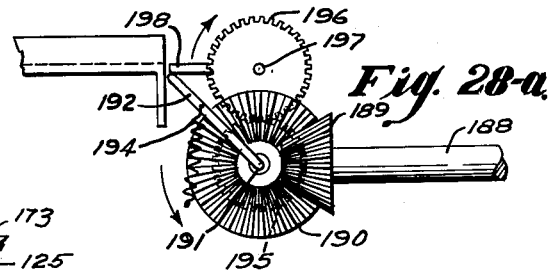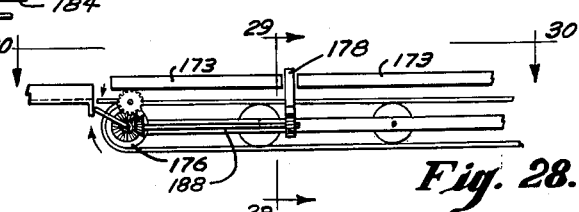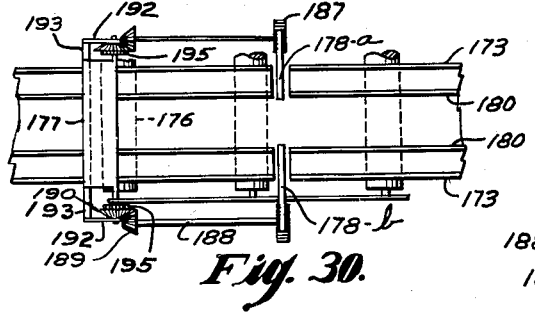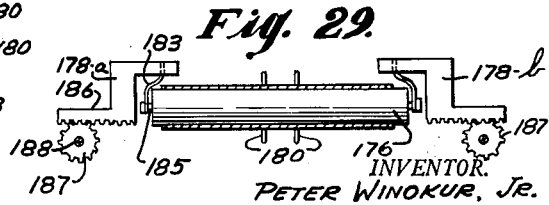

United States Patent Office 2,743,827
Patented May 1, 1956

2,743,827

SELF-SERVICE MARKET CONSTRUCTION

Peter Winokur and Edwin J. Ellis, Philadelphia, Pa.

Application February 24, 1951, Serial No. 212,608

5 Claims. (Cl. 214—16.1)

The present invention relates to conveyors and to storage apparatus associated with said conveyors and particularly to conveyors and storage-apparatus for removing self-service carts from adjacent the check-out booths or counters of supermarkets, storing the same in an inconspicuous place other than on the shopping floor-level of the supermarket, and then delivering said carts from said storage-space to a pay-out booth therefor adjacent the customer-entrance of the supermarket.

The present invention also relates to a construction for a self-service supermarket wherein carts or the like are supplied to customers and into which carts the customers may place the items they select as they travel through the supermarket, said supermarket construction including a cart-transfer adjacent each check-out booth or counter and a cart-transfer adjacent the customer-entrance zone of said supermarket; said first-named cart-transfer adapted to receive a cart (after the customers' purchases have been removed therefrom at the check-out counter) and remove it from the shopping floor-level of the supermarket, and place it in storage (along with a plurality of other similar carts); said second-named cart-transfer adapted to remove said carts from said storage space and deposit them, one cart at a time, near the customer-entrance of the supermarket where a customer may select such cart prior to his trip through the supermarket.

An object of the present invention is to provide a supermarket construction wherein the empty self-service carts supplied to the customers are removed from the shopping floor-area of the supermarket (after the cashier removes the purchases therefrom), placed into storage on an area other than the shopping floor-area and then supplied, one at a time, into customer-selecting position adjacent the customer-entrance of the supermarket.

Another object of the present invention is to provide a cart-transfer and a cart-conveyor which automatically remove the self-service carts from the shopping floor-area adjoining the check-out booths or counters in a self-service type of supermarket and automatically returns the said carts to the shopping floor-area of the supermarket near the customer-entrance thereof.

Another object of the present invention is to provide controls for cart-transfers and cart-conveyors which permits the removal, stacking and storing of self-service carts at a place other than the shopping floor-area of a super-market; said controls to be arranged and inter-connected whereby to permit the storage of a plurality of carts in a small space, and whereby the placing of said carts into said storage will be accomplished automatically by pressing a button adjacent the cashier's booth in the check-out section of the super-market.

Still another object of the present invention is to provide a cart-conveyor for storing supermarket carts which includes a plurality of interconnected cart-transfers and controls whereby a plurality of said carts may be stored automatically in a small space.

Another object of the present invention is to provide a plurality of cart-receiving booths and cart-transfers in the check-out area of a self-service supermarket and controls for said booths and cart transfers, said controls interconnected so that carts may be deposited in each of said booths upon each of said transfers and removed therefrom to a single common conveyor belt or track without the cart so-transferred from one booth interfering with the carts being removed from other booths.

Another object of the present invention is to provide cart-transfers and cart-conveyors whereby super-market carts may be removed from storage by said transfers and automatically supplied to the shopping floor-area of a supermarket upon the removal from said transfer of a cart previously supplied to the floor-level of said supermarket.

Further objects will be apparent by reference to the appended specification, claims and drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring now to the drawings in which like reference characters indicate like parts:

Figure 1 represents a fragmentary perspective view, partly broken away, of a supermarket construction embodying one form of the present invention; illustrated schematically.

Figure 2 represents a schematic top plan view of the embodiment shown in Figure 1.

Figure 3 represents a section generally on line 3—3 of Figure 2.

Figure 4 represents a schematic cross-sectional view, generally on line 3—3 of Figure 2, showing, in vertical cross-section, one of the hinged ramps and the electromagnetically retracted and spring-closed retainers for normally holding the ramp in its horizontal position.

Figure 5 represents a top plan view of one of the down-tiltable cart-ramps shown in Figure 2; illustrated schematically.

Figure 6 represents a section on line 6—6 of Figure 5.

Figure 7 represents a schematic top plan view of the switch-section or switch-portion of the underground or sub-floor cart-conveyor intermediate the cart-receiving stations and the cart-payout stations.

Figure 8 represents a schematic cross-sectional view, generally on line 8—8 of Figure 7, illustrating one embodiment of switching mechanism forming part of the present invention.

Figure 9 represents a schematic top plan view of the mechanism schematically illustrated in Figures 7 and 8, but showing the electrical actuating means therefor.

Figure 10 represents a side elevational view, partly in section, of one arrangement (schematically shown) of a cart-gate (in advance of a cart-elevator at one of the terminals of the underground conveyor) representing one embodiment of the present invention.

Figure 11 represents an end elevational view of an elevator at one of the termini of the underground conveyor; shown schematically and representing one embodiment of the present invention.

Figure 12 represents a top plan view of the elevator shown in Figure 11.

Figure 13 represents a side elevational view, partly in section, similar to that shown in Figure 10, but showing a cart-gate and a cart-elevator at one of the terminals of the underground conveyor, whereby the carts are elevated, one at a time, to the pay-out point of the pay-out station; all schematically shown and representing one embodiment of the present invention.

Figure 14 represents a top plan view of the cart-gate and cart-elevator shown in Figure 13.

Figure 15 represents a wiring diagram of an electrical control of the cart-delivery means for delivering the carts to the conveyor, such as the cart-ramps illustrated in Figure 4; representing one embodiment of the present invention.

Figure 21 being on the same scale as Figure 17 and on a somewhat larger scale than Figure 16.

Figure 24 represents a schematic top plan view of a conveyor switch of the embodiment shown in Figures 16 to 30, inclusive.

Figure 25 represents a section on line 25—25 of Figure 24.

Figure 26 represents a schematic side-elevational view of the switch portion shown in Figure 24.

Figure 27 represents a side-elevational view of the nesting and storage portion of the second embodiment of the present invention, which is also shown in the left-hand side of Figures 24 and 26, but Figure 27 shows a number of carts which have been nested upon the storage portion of the conveyor of this embodiment of the present invention.

Figure 28 represents a side-elevational view of the end of one of the cart-storage portions, showing the cart-gate and the elevator just beyond the gate for raising the carts to the pay-out station at the shopping level.

Figure 16:
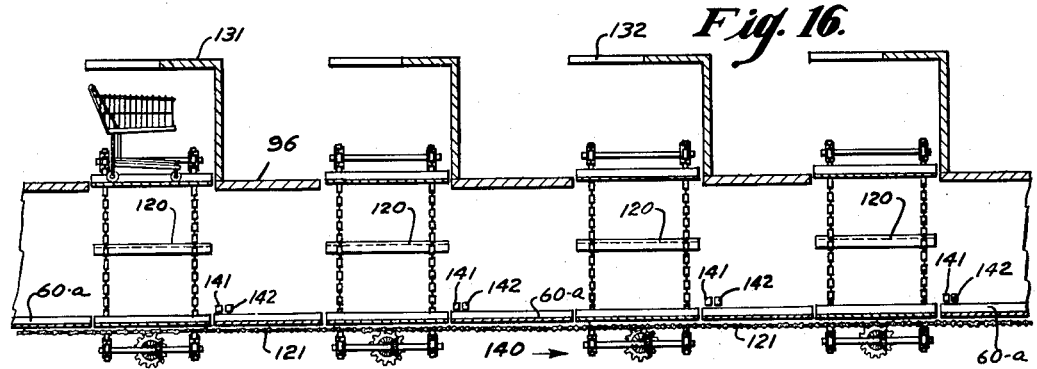
Figure 16 represents a schematic side-elevational view, in section, of a series of cart-receiving stations and an underground rail and conveyor and downwardly delivering cart-elevators intermediate the two, representing another embodiment of the present invention.

Figure 28–a represents a view similar to that shown in Figure 28, but is only of the cart gate and gears and is on a larger scale.

Figure 29 represents a section on line 29—29 of Figure 28.

Figure 30 represents a top plan view of Figure 28, viewed on line 30—30 of Figure 28.

Figure 31 represents an electrical diagram showing a photocell-controlled motor circuit for the elevator shown in Figures 11 to 14 inclusive, which elevator, as shown schematically in these views, may be used in the embodiments exemplified in Figures 2, 5, 7 and 10 (i. e. wherein the carts are conveyed from beneath the cart-receiving stations to beneath the cart-payout stations, by gravity, upon slightly inclined channels), as well as in the embodiments exemplified in Figures 16, 17, 18, 19 and 24 to 30 (i. e. wherein the carts are conveyed from beneath the cart-receiving stations to points beneath cart-payout stations by channels over which the carts are propelled by hooks or abutments engaging the carts on the links or other parts of a conveyor belt, through part of their travel, and by a flat belt-type moving table over the balance of their travel, upon which flat belt they are stored in nested condition).

In the perspective view which is Figure 1 and which is generally applicable to both embodiments of the invention shown in the drawings, there is illustrated the entrance zone 33 and exit zone 34 of a supermarket type of self-service store with one or more entrance-doors 35 leading to the entrance zone 33, and with one or more exit-doors 36 leading from the exit zone 34.

The entrance zone 33 and exit zone 34 are preferably side by side, or closely adjacent to each other, but preferably separated by any suitable barrier, such as a railing 37 or the like, and both said zones are preferably (though not necessarily) at one end of the supermarket or self-service store. In the exit zone 34 a number of check-out booths 41, 42, 43 and 44 are provided with passageways 45, 46, 47 and 48 between adjoining booths; passageway 45 being between the booth 41 and the barrier or rail 37.

Each check-out booth, in turn, is provided with a cashier's compartment 49 containing a seat, and a door 50 for access to the cashier's compartment, and a cash-register 51, and a checking-counter 52. At one end of each checking-counter, preferably at its outer end, a cart-receiving stall 53 is provided, into which the shopping-cart 54 may be pushed after the merchandise has been unloaded therefrom onto the checking-counter 52.

The bottom or floor of each cart-receiving stall 53 is so arranged that it will permit the transfer of the cart in the stall to a lower level below the shopping floor, and from there onto a conveyor which, in turn, will transfer the cart to a point beneath the entrance zone 33, from where the cart is again elevated to one or several pay-out stations 55 and 56, where customers entering the store may take a shopping cart 54 for their shopping-trip through the store.

In one embodiment of the present invention, shown, in part, in Figures 3 to 9 and 15, the cart-transfer from the shopping floor downward to the sub-floor portion of the present invention, is by means of tiltable hingedly arranged ramps 57, composed of a pair of channel-shaped rails 57–a and 57–b, hinged at 58, (as shown in plan view in Figure 5 and cross-section in Figure 6), having slightly protruding tongue portions 59, which are adapted to nest in and to register with the corresponding inclined conveyor-rails 60–a and 60–b at the lower level, which are adapted to receive the carts from the inclined ramps 57.

The conveyor-rails 60 are in operative alignment with each of the ramps 57, and are, in turn, inclined in the manner generally indicated in Figure 3, so that when a cart has been delivered to the conveyor-rails 60, by means of the ramps 57, the carts will travel along the conveyor-rails by force of gravity.

For increasing the storage-capacity and also for delivering the carts to two or more pay-out stations such as the pay-out stations 55 and 56, the conveyor-rail 60 may be provided with a switch 61, for dividing the flow of carts onto two storage-sections of the conveyor, as, for instance, the storage-sections 62 and 63, respectively.

The switch 61 is preferably provided with a stationary bottom 64, continuous with the bottom webs of the rails 60 and also continuous with the bottom web of the corresponding rails of the storage-sections 62 and 63, and is also provided with a deflector or switching guide-plate 65, pivoted at 66, adapted to be deflected into one or the other of its two positions shown in solid lines and in dotted lines, respectively, in Figure 7. The vertical flanges of the rails 62 and 63 terminate at the two terminal positions of the deflector-plate or switching-plate 65, as indicated in Figure 7. The vertical pivot-pin or shaft 66, to which the deflector-plate or switching-plate 65 is secured, may, in turn, be connected with a rotary solenoid 69, preferably underneath the rails 62 and 63, and a pair of similar electrical switches 67 and 68 (differentially or oppositely connected to the solenoid 69)

may be so placed in the storage-sections 62 and 63 (see Figure 7) that as a cart passes either one, it will cause the solenoid 69 to switch the deflector 65 so as to close off the storage-section whose switch has just been passed by a cart, and thereby to open the other storage-section so that the next cart will pass from the conveyor-rails 60 into the other storage-section.

At the end of each storage-section 62 and 63, a gate and elevator are provided, whereby one cart at a time will be permitted to enter the elevator; the elevator, in turn, then raising the cart to the shopping level and placing it in or at the pay-out station (55 or 56).

The elevator 124 (illustrated schematically in Figures 11 to 14) may consist of a pair of suitably spaced endless-web belts or link-belts 70-a and 70-b, supported on top and bottom rollers or sprocket-wheels 71 and 72, respectively, which are revolubly mounted upon the axes 73 and 74, respectively.

The belts 70 have affixed thereto several sets of juxtaposed pairs of rails 75, 76 and 77, of a length sufficient to accommodate a cart, so that a pair of these rails will constitute an elevator-platform for a cart when such pair is on the inner side of the elevator-belts 70.

The pair of elevator-belts 70 are gear-connected or gear-and-chain connected by or to a common positive drive, so that the two elevator-platform rails of each pair will always be in the same phase of the cycle of the belts, so as to constitute an aligned and common support or platform for the cart.

Intermediate the elevator 124, shown particularly in Figures 11 to 14, and the storage-section (62 or 63), a gate (shown generally in Figures 10, 13 and 14) is provided, for releasing only one cart at a time for passage onto the elevator and for holding back all the other carts on the storage section. The gate may be formed of a pair of forked barriers 80 and 81, respectively, each slidably mounted in suitable vertical guides and adapted to slide into and out of alignment with the bottom wheel-level of the cart and being connected by suitable linkage, such as the potentially pivoted beams or arms 82, pivoted at 83, whereby one of the barriers will be elevated while the other one is depressed, and vice versa. The horizontal distance between the two barriers 80 and 81 is approximately the length of a cart.

An automatic interlock or operating connection is to be provided between the elevator 124 and the gate, so that when the elevator starts moving upwardly, with the cart thereon, the raising of the cart-bearing platform of the elevator will automatically raise the barrier 81 nearest to the elevator and will lower the barrier 80 farthest from the elevator. This may be done, for instance, by the pinion 84, pivoted at 85, and meshing with the rack 86 carried by the barrier 81 nearest to the elevator, and the trip lever 87 connected to a shaft or axle 85 of the pinion 84, whereby the upward movement of the cart-bearing platform-rails 85 will deflect the lever 87 upwardly and thereby lower the barrier 81 and raise the barrier 80.

A suitable spring 88 may be interposed between the beam 82 and a stationary part of the frame, for yieldably urging the beam 82 into the position where the barrier 81 is raised and the barrier 80 is lowered. The spring may be a coil-spring (not shown) disposed about the pivot-rod 83 in torsion, or, as shown in Figures 10, 13 and 14, may be a helical tension-spring interposed between the beam 82 and rail or some stationary frame portion. As a pair of platform-forming rails 85 come into position to receive a cart, they deflect the lever 87 upwardly and thereby lower the gate 81 nearest the elevator and raise the gate 80, to stop the movement of the rest of the carts.

A motor 90 is connected to a common drive-shaft 91, which, in turn, is connected to the pair of lower belt-drum or sprocket-wheel axles 74-a and 74-b, through suitable bevel gears 92 and 93, so as to drive the belts or link the belts in unison with each other.

The electric motor 90, may, in turn, be controlled through a suitable electric circuit for stopping the elevator 124 when the cart reaches the shopping level and for starting the elevator when the cart is removed from the elevator. One suitable electric circuit, exemplified in Figure 31, may include a photo-electric cell 94 therein, upon which the beam of light 97 is focused from a constant source of electric light 95 (see Figure 11), which are preferably below the casing or housing 98; the beam 97 emitted by the light-source 95 and focused on the photo-electric cell 94 being in the path of the wheeled cart on the elevator; and sufficiently above the shopping floor level 96, so that when the light-beam 97 is first interrupted by the top of the ascending cart, the bottom of the cartwheels or casters will be substantially at the shopping floor level 96.

In the electric control circuit illustrated in Figure 31, the photo-electric cell 94 is connected in series with the winding 99-a of an electro-magnetic relay-switch designated generally by the numeral 99 and represented by the dotted-line enclosure; which winding is connected to the power lines. The motor 90 is connected across the same power lines through the normally open switch 99-b (of the electro-magnetically operated switch 99); the core 99-c being so disposed within the winding coil 99-a, and being operatively connected to the movable member of the switch 99-b, that when light impinges upon the photo-electric cell 94, current passes through the winding 99-a and the core 99-c will be drawn through the coil 99-a and will, in turn, close the switch 99-b and the motor 90 will be energized. When the light-beam 97 is interrupted by the top of the cart, the winding 99-a is de-energized and the switch 99-b is opened (by any suitable means such as the spring 99-d). When the cart is removed, at the pay-out point, the light-beam 97 again is permitted to impinge upon the photo-electric cell 94, thus to start the motor 90 and keep the elevator 124 in operation until the next cart apears at the top level. If desired, a suitable time-lag means (not shown) may be interposed in the electrical circuit for delaying the starting of the motor 90 after the light-beam 97 first impinges upon the photo-cell 94, for a few seconds or so, until the cart has been fully removed from the elevator 124 and from the payout station 55 or 56. However, in lieu of such time-lag means (which may be a dashpot on the armature 99-c) the cart 54 may be provided with a continuous light-interrupting or light-barrier band of sufficient width, along the entire length of its upper edge, so that the light will remain interrupted until the cart is fully removed from the elevator.

Each of the ramps 57 may be normally held in its horizontal or receiving position, at the shopping floor-level 96, by a latch or retainer 100 (Figure 4) which may be in the form of a bolt, pivoted-lever or the like, spring-urged into its latching or retaining position by a suitable spring 101, and retracted therefrom by an electro-magnet including the solenoid 102 and the core 102-a operatively connected to the bolt or latch 100. As shown in Figure 15, each of the latch-retracting solenoids 102 is permanently connected to one side (103) of an electric power-line, while the other side of each of the latch-retracting solenoids terminates in a switch or contact 104 of a normally open switch or relay; the movable armature-operated contact 105 of which is pivotally or hingedly mounted at 106, and is operatively connected to the core or armature 107 of the relay. The relay solenoid-coil 108 is, in turn, connected to the power line 103, at one of its ends, while its other end is connected to one side of a push-button switch 109 which is in the cashier-checker's compartment or within easy access to the cashier or checker. By depressing any one of the switch-buttons 110, the corresponding switch 109 is closed and the relay-solenoid 108 connected in series therewith is energized through the entire series of normally closed and series-connected contacts 111 of the relays. This causes the corresponding core 107 and switch-member 105 to be moved so as to "open" the corresponding contact 111 and "close" the corresponding contact 104; thereby to energize the corresponding latch-retracting solenoid 102 and to release the corresponding ramp 57 and deliver the cart thereon onto the sub-floor conveyor 60. A slow release or delayed return of the relay armature or core 107 and of the switch-member 105 may be provided as, for instance, by a dashpot (not shown) or other delaying means, so that the relay (composed of members 104, 105, 107, 108 and 111) which has been actuated, will not return to its normal position for a length of time slightly in excess of the length of time required for the cart 54 to have been transferred to the lower conveyor 60 and to have passed the extensions or tongues 59 of the last ramp 57 in the row of such ramps, so that none of the other ramps 57 can be released (by the pushing of their corresponding button 110) until the cart last transferred to the lower conveyor 60 has passed the end-point of the last ramp in the series.

The ramps 57 may be returned by spring-pressed plungers or levers, as, for instance, the spring-loaded rod 114, pivotally connected at one end thereof to the bracket 115 on a stationary part of the structure, while the other end thereof enters the tubular casing 116, in which is contained a helical compression spring bearing against the end of the rod 114; the end of the tubular housing 116 being, in turn, pivotally connected to the bracket 117 affixed to the underside of the ramp 57 (in the manner similar to the spring-operated door-closers).

The tension of the spring or the compression of the spring is so adjusted or selected, that the ramp 57 will be deflected downwardly by the mere weight of the cart 54 thereon (once it is released by the retraction of the latch 100), and so that the force of the spring will be sufficient to raise the ramp 57 into its own uppermost, horizontal and latched position when the cart has left the ramp.

By the aforesaid construction, the carts 54 are lowered, by the cashier, to the lower conveyor, without interference from any other cart, because the carts in the other stalls 53 cannot be released until the cart last released has passed the last ramp, and the carts so delivered to the conveyor are automatically transposed to the elevators 124 (which elevators are shown in greater detail in Figures 11 to 14 inclusive) where the carts are elevated, one at a time, to the pay-out points 55 and 56, and where they remain on the then-immobile elevator 124 until taken by a customer, whereupon the elevator 124 is energized and the next cart brought into delivery position (as heretofore described), ready for the next customer.

In the modified embodiment of the present invention, one phase or aspect of which is shown in Figures 16 to 30 inclusive, the transfer of the carts from the shopping-level 96 to the conveyor and storage level, is effected by a series of elevators designated generally by the numeral 120, and the conveying or transferring of the carts from the points beneath check-out booths (41, 42, 43 and 44) to beneath the pay-out points 55 and 56, is effected by a power driven conveyor-belt or chain 121 between the channel-like rails 60–a and 60–b (which may be horizontal or without any appreciable inclination), carrying hooks 122 on certain of its links, spaced apart, which hooks 122 project upwardly to a level high enough to engage a lower cross-bar 123 or a wheel-axle of the cart 54.

In this embodiment of the invention, the conveyor-chain 121 is endless, and passes over terminal-sprockets at either end of its run, with the horizontal upper span of the chain disposed just between the channels 60–a and 60–b (or slightly below their level) and the lower span being directly beneath it, and the terminal sprockets having their axes generally horizontally disposed.

In this embodiment of the present invention, the guide-rails 60–a and 60–b and the conveyor-chain 121 therebetween may extend only a part of the distance from the down-elevators 120 to the up-elevators 124, and the balance of the distance (namely, the distance between the delivery-end of the rails 60–a and 60–b and chain 121 and the up-elevator 124) may be occupied by a flat web-belt 125, moving in the same direction as the chain 121 but carrying the carts 54 not by positive inter-engagement therewith but by merely having the wheels of such carts rest upon the belts. The flat belt 125, in turn, delivers the carts to the up-elevator 124, so that a storage space is thereby provided for accumulation of carts; which storage space is capable both of retaining the carts thereon and also of advancing them when there is a call for a cart. Thus, the belt 121 accumulates the carts and advances them forward, toward the elevators 124 and starts them (with or without nesting, according to the type of cart used) against the elevator-gates 178 or 198 (see Figures 28–a and 29) and holds them there until the elevator 124 is ready to receive another cart, whereupon the belt advances the next cart onto the elevator, while retaining the balance of the accumulated carts behind the gates 178.

The down-elevators 120 are generally the same construction as the up-elevators 124 (shown in Figures 11 to 14 inclusive) but travel in opposite direction. The down-elevators preferably are driven from the power-driven chain 121 through electrically controlled clutches 129 mounted on or associated with the sprocket-wheels 130 on the elevator drive-shaft 130–a, whereby the "closing" of the clutch 129 energizes and operates the down-elevator 120. When the clutch 129 is "open," the down-elevator 120 stops and remains stationary.

The top of each of the down-elevators 120 is preferably covered over by a housing 131, (Fig. 16), within the cart-stall 53 (Fig. 1) with an opening 132 in the top and front thereof, sufficient to accommodate the carts, and to guide the carts onto the rails (75, 76 and 77) of the down-elevators 120.

Figures 22, 23:
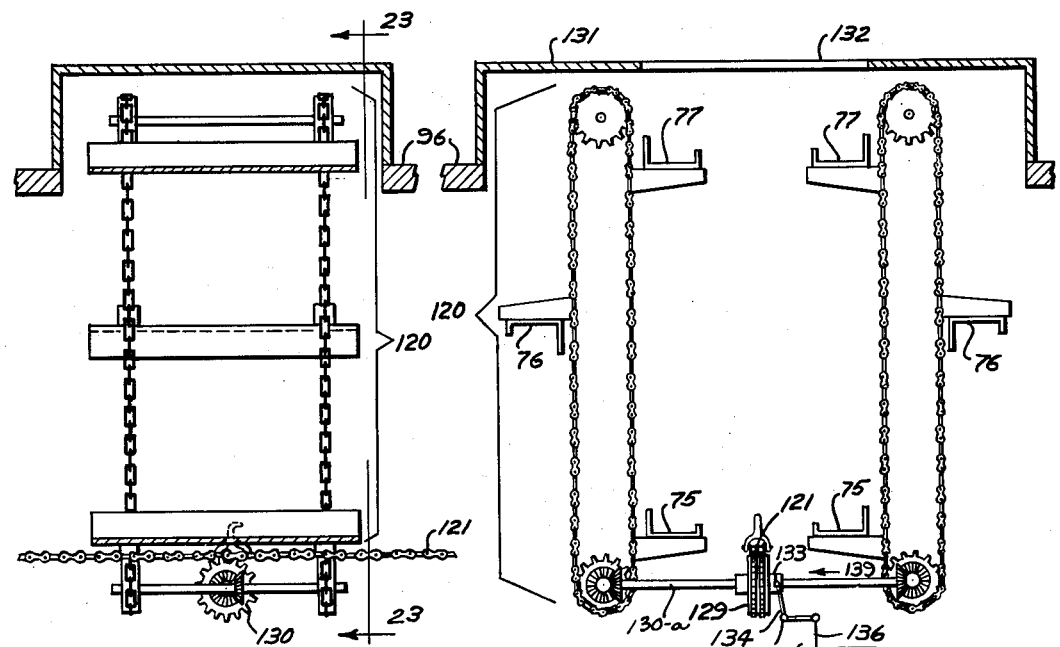
Figure 22 represents a side elevational view of one of the elevators shown in Figure 21.
Figure 23 represents an end elevational view of one of the elevators, taken generally on line 23—23 of Figures 21 and 22.

The clutch 129 may be a cone-type or disc-type clutch or a band-type clutch. In the illustration of Figure 23, a disc-type or cone-type clutch is indicated, the hub 133 of which has an annular groove therein, engaged by the upper forked end of the bell-crank lever 134, pivoted at 135; the other end of which bell-crank lever is connected by a rod 136, to the armature or core 137 of the electro-magnet 138, so that when said electro-magnet is energized, the bell-crank lever 135 is tilted so as to close the clutch in the direction of the arrow 139.

A photo-electric cell 141 and a light-source 142 in alignment therewith are disposed to flank or span each down-elevator 120 and the rail-sections 60–a and 60–b in advance thereof, at a level whereat the light beam will be interrupted by a cart 54 (or some special light-interrupting band on the cart) as the cart approaches the particular down-elevator, and will also be interrupted by the elevator-rails or channels (75, 76 or 77) as the pair of such rails descend into alignment or approach aligning-position with the rails 60–a and 60–b.

Figure 20:
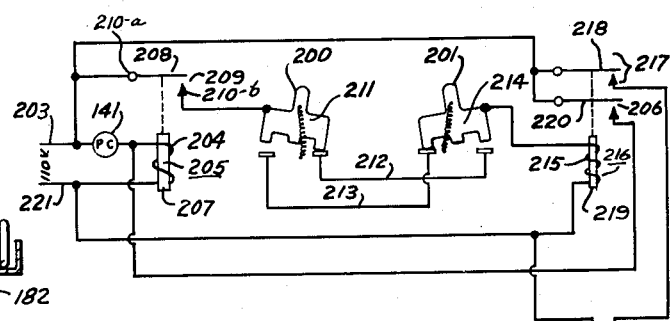
Figure 20 represents a wiring diagram of an electrical control forming a part of the embodiment of the invention exemplified in Figures 16 to 30, inclusive.
Figure 21:
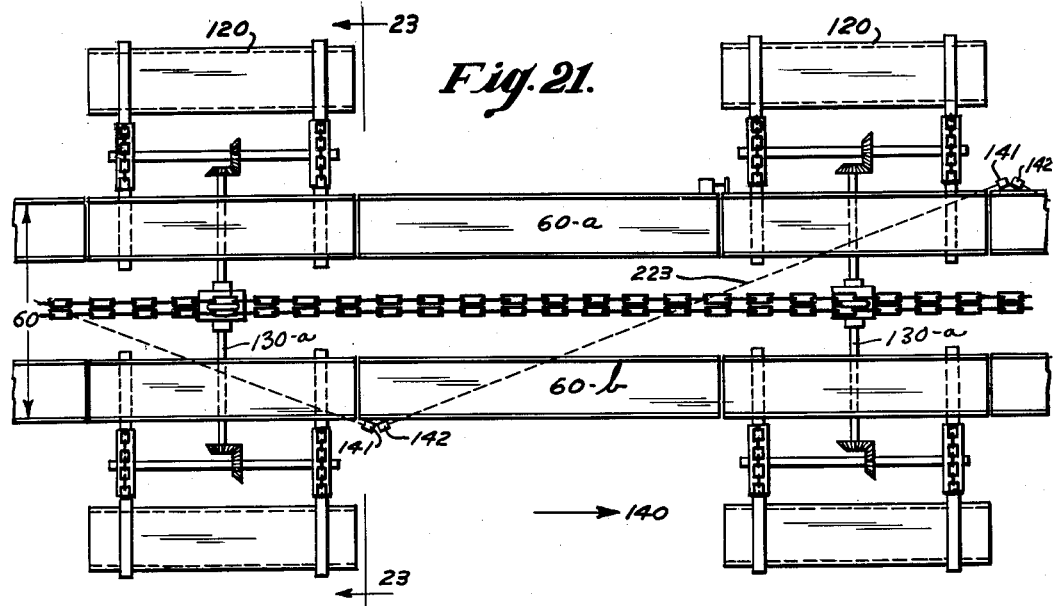
Figure 21 represents a schematic top plan view of the sub-floor conveyor and two of the elevators for delivering the carts from the cart-receiving stations (i. e. at the check-out booths) to the sub-floor conveyor, representing one embodiment of this phase of the present invention.

The clutch-controlling circuit (or the motor-controlling circuit if a separate driving motor similar to the motor 90 is used for each down-elevator in lieu of the chain-drive and clutch mechanism indicated in Figures 22 and 23) is shown particularly in Figure 20. This electrical circuit includes a cashier-operated switch 200 and an elevator-controlled switch 201. These switches 200 and 201 are shown, for purposes of illustration, in a diagrammatic form, as being toggle switches having an external rocking arm adapted to be tilted in one direction for the "closing" of one circuit and "opening" of another circuit, and to be tilted in the opposite direction for opening the first circuit and closing the second circuit. The switches 200 and 201 may be push-button switches of the type which close one of two circuits connected thereto when the button is depressed, and which will close the second circuit (opening the first) upon the next push of the button. Or the switches 200 and 201 may be of the rotary type.

The elevator-controlled switch 201 may be operated by the elevator-rails (or by any other suitable projection or cam upon the elevator-rail) even though the rail or projection or cam moves in the same direction at all times. Thus, a rotary-type switch may be used, with a star wheel secured to the shaft thereof, each tooth of the star wheel adapted to be engaged by the rail or projection thereon as the rail comes into position, so as to open the then-live circuit (which had theretofore been established through the switch 201) and to close the switch for the other circuit. Similarly, a single-push type switch may be used as the switch 201, with a button-depressor carried by the elevator-rail, which will depress the switch as the elevator-rail comes into alignment with the conveyor-rails 60.

The photo-electric cell 141 has one terminal thereof connected to one wire of the electric power source 203, while its other terminal is connected to the coil 204 of the circuit-holding electro-magnet 205, and also to the cell-bypassing relay-switch 206. The core 207 of the circuit-holding electro-magnet 205 is connected to the movable contact arm 208 of the relay-switch 209, one side 210–a of which is connected to the power-line 203, while the other side 210–b is connected to the movable element 211 of the cashier-operated switch 200, which element 211 is common to both of the alternate circuits 212 and 213 interconnecting the cashier-operated switch 200 and the elevator-operated switch 201. The elevator-controlled switch 201 has its corresponding movable element 214 connected to the coil 215 of the circuit-holding and relay operating electro-magnet 216. A relay switch 217 is connected directly between the line 203 and one side of the clutch-operating (or motor-circuit-closing) electro-magnetic coil 138; the movable switch element 218 of the relay 217 being operatively connected to the movable core 219 of the electro-magnet 216. The movable element 220 of the relay-switch 206 also is connected to the movable core 219. Thus, whenever the coil 215 of the electro-magnet 216 is energized, both the by-pass switch 206 and the relay switch 217 will be closed; the by-pass switch 206 serving to shunt out the photo-electric cell 141, so as to keep the electro-magnet 205 energized, while the relay switch 217 serves to energize the clutch-actuating electro-magnet 138 (or, in the alternative, to energize an elevator-driving electric motor similar to the electric motor 90).

The other side of the by-pass or shunting switch 206 is connected to one wire 203 of the power-supply. The other wire 221 of the power-supply is connected to one side of each of the coils 204 and 215 as well as to the coil 138, to complete the circuits.

A circuit similar to the one illustrated in Figure 20, is provided for each down-elevator and its corresponding checker's booth (41, 42, 43 and 44).

When the merchandise from a cart 54 has been emptied onto the checker's counter 52 and the empty cart wheeled into the stall 53, the checker-cashier may then (or any time thereafter, and before the next cart is ready to be wheeled into the stall 53) press or deflect the button 110 of the switch 200, suitably located within the checker's reach, so as to close one of the two alternate circuits 212 or 213, that is, that one of the two alternating circuits which on the last operation was closed by the elevator-actuated switch 201. If at that time a cart is on the rail-section 60 immediately ahead of the down-elevator or if such a cart is underneath the down-elevator or within the down-elevator, the light-beam 223 intervening the photo-electric cell 141 and the light-source 142, will be interrupted, so that the circuit of Figure 20 will remain inoperative by the initial non-energizing of the electro-magnet 205. However, if the light-beam 223 is not interrupted at that time or is "cleared" or established at any time thereafter, the circuit of Figure 20 will be set into operation without any further attention on the part of the cashier or checker. Thus, as soon as the light-beam is re-established, the circuit-holding electro-magnet 205 will be energized through the photo-electric cell 141 and the relay circuit 209 closed thereby and a circuit established through the pre-set checker-controlled switch 200 and through the elevator-set 3-way switch 201, through the electro-magnet 216, thereby to energize the latter. This energization of the electro-magnet 216, in turn, closes the elevator-actuating relay switch 217 as well as the cell-shunting switch 206.

By this means the elevator-energizing circuit is effective whereby to move the elevator 120 and the cart 54 thereon downwardly until the elevator-controlled switch 201 is moved into its alternate position by virtue of the elevator-rails 75, 76 or 77 which support the cart coming into alignment with the rails 60. This circuit is maintained in its energized condition, despite the fact that the cart 54 then interrupts the light beam 223, by reason of the fact that the photo-cell 141 has been by-passed by the shunting switch 206, and the circuit-holding electro-magnet 205 thus maintained energized. When the elevator-operated switch 201 is moved into its alternate-circuit position, then, of course, the electro-magnet 216 is de-energized and the switches 206, 209 and 217 opened, and the elevator brought to a stand-still. This leaves the circuit then open for the next cycle of its operation which is dependent upon both the checker-controlled switch 200 being moved into its alternate-circuit position as well as the photo-electric cell 141 being in its energized or circuit-making state (i. e., by the absence of any intervening cart).

In this manner, each of down-elevators may be operated independently by the checkers or cashiers from its own checking-booth to a common conveyor-chain or conveyor-belt, without regard to the operation of the other elevators, and with the assurance that the cart lowered by one elevator cannot interfere with the operation of the others.

Instead of driving the down-elevators 120 from the conveyor chain 121, in the manner above indicated, an individual electric motor operatively may be connected to each of the elevators, in the manner of the motor 90 shown in Figures 12 and 14, which motor then replaces the clutch and sprocket-wheel 129 and 130 upon the shaft 130–a. If an individual electric motor is used in or connected to the shaft 130–a, then the electro-magnet 138 is used to close or open the motor-controlling switch.

Instead of the bevel-pinions 92 and 93 between the main drive shaft 91 and the lower shafts 74–a and 74–b, opposed worms and corresponding worm-gears may be used, so as to make the drive irreversible between the drive shaft 91 and the elevator; the bevel-gears 92 at each end of the shaft 91 being replaced by a pair of oppositely threaded worms, and the gears 93 being replaced by a pair of oppositely cut worm-gears meshing with the worms.

In the embodiment of the invention shown particularly in Figures 16 to 30, inclusive, the channels 60, with the chain 121 therebetween may have its terminal (shown in Figure 26) located at any point short of the up-elevators 124, as, for instance, at a point 170 indicated in Figures 1 and 24, where a distributing switch 172 (Figures 24 and 26) similar to the distributing switch shown in Figures 5 to 9 inclusive, is provided, but inclined slightly downwardly, and feeding to the two storage belts 125–a and 125–b (flanked by stationary guide rails 173), which belts are driven at a constant speed over rollers 174 and 175, with their terminals 176 at the elevators 124. On the storage belts 125 (a and b) the carts 54 are nested in a manner indicated in Figure 27, stacked against the gates 178–a and 178–b.

Figure 17:
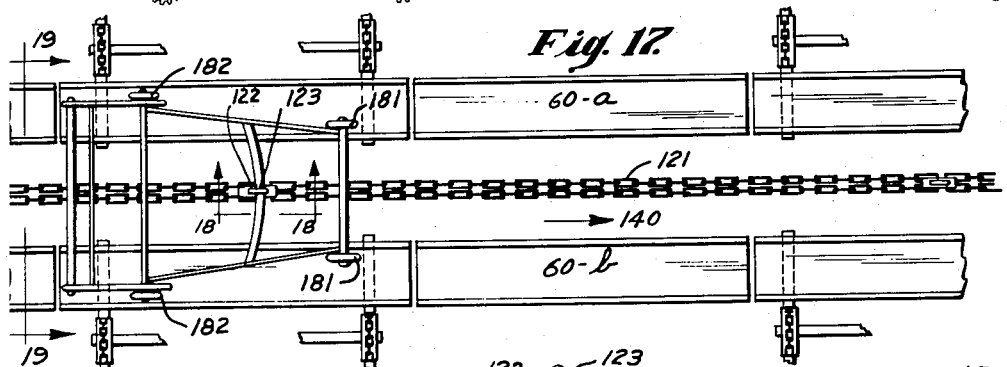
Figure 17 represents a schematic top plan view of a fragmentary portion of the underground conveyor of the second embodiment of the present invention.
Figure 18:
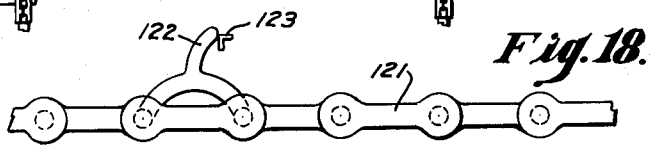
Figure 18 represents a fragmentary side-elevational view of a conveyor-chain which forms a part of the conveyor mechanism of Figures 16 and 17.
Figure 19:
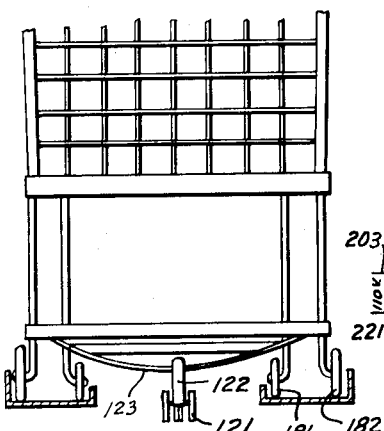
Figure 19 represents a fragmentary section on line 19—19 of Figure 17.

The belts 125 may be provided with beads or ridges 180, molded directly on the belt or fixed thereto at suitable intervals to constitute a more or less continuous ridge or bead, just high enough to act as a guide or lateral barrier for the closely spaced front wheels 181 of the cart 54; the more widely spaced rear wheels 182 being, in turn, guided by the side rails 173. Thus, the beads 180 take the place of the inner flanges of the channels 60–a and 60–b (Figure 17).

The outer rails 173 may be carried by suitable brackets 183, extending upwardly from the stationary member 184 which interconnect the shafts 185 of the idler rollers 175.

The gates 178 (a and b) are horizontally or laterally movable, in any suitable guides (not shown) or they may be made to swing in and out, generally laterally, about suitable pivots.

A suitable gap or clearance is provided in the guide-rails 173, in the manner indicated in Figures 28 and 30, to provide a clearance through which the gates 178 (a and b) may enter into the path of the wheels or undercarriage of the cart 54.

The gates 178–a and 178–b move to and fro from their closed position shown in Figure 29, to an open position (in which the opposed ends of these gates are spread apart to clear the wheels of the cart) by means of racks 186, and pinions 187, the latter carried upon the shafts 188. The shafts 188 may be provided with bevel pinions 189, at their forward ends, which mesh with corresponding bevel gears 190, carried at opposite ends of the transverse shaft 191, which, in turn, carries a pair of radially-extending levers 192, with a connecting bar 193 spanning the ends of the levers 192. The ends of the arms 192, and hence of the bar 193, project into the path of the ends of the elevator-channels (75, 76 and 77) when the arms are disposed horizontally, but clear such path when disposed in their upwardly-deflected positions shown in Figure 28–a and Figure 28. A spring 194 may be provided upon the arms 192, to pull these arms downwardly.

The shaft 191 also carries a pair of pinions 195, which mesh with corresponding gears 196 upon a shaft 197 disposed parallel to the shaft 191, but generally in the plane or just slightly below the plane of the upper belt-surface 125, and carries the gate 198, which serves as a terminal gate in its upper position and as a bridging member in its lower position (the latter position shown in Figures 28–a and 30).

When one of the pairs of channels (75, 76 or 77) on the elevator comes up from beneath and deflects the arms 192 and the bar 193 (against the force of the spring 194) in a generally upward direction, into the position shown in Figure 28–a, the shaft 191 is thereby rotated, turning the gears 189, 190 and 195, as well as the shafts 188 and 197. The turning of the shafts 188 rotates the gears 187 and advances the gates 178 (a and b) into their closed position shown in Figure 29. At the same time, the turning of the gears 196 (enmeshed with the gears 195) and the shaft 197 lowers the terminal gate 198 into the horizontal or bridging position shown in Figure 28–a. This permits the last cart 54 to roll from the belt 125 onto the pair of elevator-rails. As the elevator-rails then rise, they release the bar 193, and the spring 194 thereby returns the terminal gate 198 to its closed position and retracts the gear gates 178 to their open position so as to permit the entire row or line of carts to advance until the forward cart abuts the then-closed terminal gate 198. This sequence of operations is repeated each time one of the pairs of elevator-rails (75, 76 or 77) rises to the level of the belt 125.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described our invention, what we claim as new and desire to protect by Letters Patent is the following:

1. A system for the transfer and storage of wheeled carts including a cart-feeding zone having a plurality of cart-feeders, each cart-feeder adapted to transfer an individual cart, a cart-dispensing zone, a plurality of cart-dispensers in said cart-dispensing zone, said cart-feeding and cart-dispensing zones spaced from each other at generally the same level, a cart-storage area beneath the level of the cart-feeding and cart-dispensing zones, a conveyor for moving wheeled carts on said cart-storage area, said conveyor having a cart-storing and cart-conveying section in operative alignment with the plurality of cart-feeders, said cart-storing and cart-conveying section constructed and arranged to receive a plurality of carts in series relationship to each other, a plurality of cart-storing and cart-conveying portions in alignment with said cart-storing and cart-conveying section and each of said portions aligned with a cart-dispenser, each of said portions constructed and arranged to receive at least one cart, a cart-operated switch interconnecting said cart-storing and cart-conveying section with the plurality of cart-storing and cart-conveying portions, said switch being automatically switchable from one of said cart-storing and cart-conveying portions to another after a cart passes thereover whereby the cart next disposed on the cart-storing and cart-conveying section will be conveyed to a different cart-storing and cart-conveying portion than the cart which immediately preceded it across the switch, an electrically-actuated control mechanism for effecting cart removal, one cart at a time, from the plurality of cart-feeders to the cart-storing and cart-conveying section, and an electrically-actuated control mechanism for effecting cart transfer from the conveyor to the cart-dispensing zone.

2. A system for the transfer and storage of wheeled carts including a cart-feeding zone having a plurality of cart-feeders, each cart-feeder adapted to transfer an individual cart, a cart-dispensing zone, a plurality of cart-dispensers in said cart-dispensing zone, said cart-feeding and cart-dispensing zones spaced from each other at generally the same level, a cart-storage area beneath the level of the cart-feeding and cart-dispensing zones, a conveyor for moving wheeled carts on said cart-storage area, said conveyor having a cart-storing and cart-conveying section in operative alignment with the plurality of cart-feeders, said cart-storing and cart-conveying sections constructed and arranged to receive a plurality of carts in series relationship to each other and including movable endless belt means constructed and arranged for engagement with such carts, whereby such carts may be conveyed at least a portion of the distance from the cart-feeding zone to the cart-dispensing zone by means of engagement with said movable endless belt means, a plurality of cart-storing and cart-conveying portions in alignment with said cart-storing and cart-conveying section and each of said portions aligned with a cart-dispenser, each of said portions constructed and arranged to receive at least one cart, a cart-operated switch interconnecting said cart-storing and cart-conveying section with the plurality of cart-storing and cart-conveying portions, said switch being automatically switchable from one of said cart-storing and cart-veying portions to another after a cart passes thereover whereby the cart next disposed on the cart-storing and cart-conveying section will be conveyed to a different cart-storing and cart-conveying portion than the cart which immediately preceded it across the switch, an electrically-actuated control mechanism for effecting cart transfer from the conveyor to the cart-dispensing zone.

3. A system for the transfer and storage of wheeled carts including a cart-feeding zone having a plurality of cart-feeders, each cart-feeder adapted to transfer an individual cart, a cart-dispensing zone, a plurality of cart-dispensers in said cart-dispensing zone, said cart-feeding and cart-dispensing zones spaced from each other at generally the same level, a cart-storage area beneath the level of the cart-feeding and cart-dispensing zones, a conveyor for moving wheeled carts on said cart-storage area, said conveyor having a cart-storing and cart-conveying section in operative alignment with the plurality of cart-feeders, said cart-storing and cart-conveying section constructed and arranged to receive a plurality of carts in series relationship to each other, a plurality of cart-storing and cart-conveying portions in alignment with said cart-storing and cart-conveying section and each of said portions aligned with a cart-dispenser, each of said portions constructed and arranged to receive at least one cart, a cart-operated switch interconnecting said cart-storing and cart-conveying section with the plurality of cart-storing and cart-conveying portions, said switch being automatically switchable from one of said cart-storing and cart-conveying portions to another after a cart passes thereover whereby the cart next disposed on the cart-storing and cart-conveying section will be conveyed to a different cart-storing and cart-conveying portion than the cart which immediately preceded it across the switch, an electrically-actuated control mechanism for effecting cart removal, one cart at a time, from the plurality of cart-feeders to the cart-storing and cart-conveying section, and an electrically-actuated control mechanism for effecting cart transfer from the conveyor to the cart-dispensing zone, a gate in the cart-dispensing zone arranged automatically to advance one cart at a time from the conveyor to a cart-dispenser, said gate temporarily restraining other carts on the conveyor and being automatically operated by the cart-conveyor in juxtaposition therewith.

4. A system for the transfer and storage of wheeled carts including a cart-feeding zone having a plurality of cart-feeders, each cart-feeder adapted to transfer an individual cart, a cart-dispensing zone, a plurality of cart-dispensers in said cart-dispensing zone, said cart-feeding and cart-dispensing zones spaced from each other at generally the same level, a cart-storage area beneath the level of the cart-feeding and cart-dispensing zones, a conveyor for moving wheeled carts on said cart-storage area, said conveyor having a cart-storing and cart-conveying section in operative alignment with the plurality of cart-feeders, an electrical control for actuating the conveyor including a cart-operated photo-electric cell arranged so that only one cart at a time will be transferred from the cart-feeding zone to the conveyor, and arranged so that no cart will be transferred so long as a previously-transferred cart remains on the initial portion of the cart-storing and cart-conveying section, said cart-storing and cart-conveying section constructed and arranged to receive a plurality of carts in series relationship to each other, a plurality of cart-storing and cart-conveying portions in alignment with said cart-storing and cart-conveying section and each of said portions aligned with a cart-dispenser, each of said portions constructed and arranged to receive at least one cart, a cart-operated switch interconnecting said cart-storing and cart-conveying section with the plurality of cart-storing and cart-conveying portions, said switch being automatically switchable from one of said cart-storing and cart-conveying portions to another after a cart passes thereover whereby the cart next disposed on the cart-storing and cart-conveying section will be conveyed to a different cart-storing and cart-conveying portion than the cart which immediately preceded it across the switch, an electrically-actuated control mechanism for effecting cart removal, one cart at a time, from the plurality of cart-feeders to the cart-storing and cart-conveying section, and an electrically-actuated control mechanism for effecting cart transfer from the conveyor to the cart-dispensing zone.

5. A system for the transfer and storage of wheeled carts including a cart-feeding zone having a plurality of cart feeders, each cart-feeder adapted to transfer an individual cart, a cart-dispensing zone, a plurality of cart-dispensers in said cart-dispensing zone, said cart-feeding and cart-dispensing zones spaced from each other at generally the same level, a cart-storage area beneath the level of the cart-feeding and cart-dispensing zones, a conveyor for moving wheeled carts on said cart-storage area, said conveyor having a cart-storing and cart-conveying section in operative alignment with the plurality of cart-feeders, said cart-storing and cart-conveying section constructed and arranged to receive a plurality of carts in series relationship to each other, a plurality of cart-storing and cart-conveying portions in alignment with said cart-storing section and each of said portions aligned with a cart-dispenser, each of said portions constructed and arranged to receive at least one cart, a cart-operated switch interconnecting said cart-storing section with the plurality of cart-storing and cart-conveying portions, said switch being automatically switchable from one of said cart-storing and cart-conveying portions to another after a cart passes thereover whereby the cart next disposed on the cart-storing and cart-conveying section will be conveyed to a different cart-storing and cart-conveying portion than the cart which immediately preceded it across the switch, an electrically-actuated control mechanism for effecting cart removal, one cart at a time, from the plurality of cart-feeders to the cart-storing and cart-conveying section, and an electrically-actuated control mechanism for effecting cart transfer from the conveyor to the cart-dispensing zone, said control mechanism including a photo-electric cell in the region of the level of the cart-dispensing zone; said control mechanism rendering the cart transfer inoperative when a cart deposited thereon has reached the level of the cart-dispensing zone.

References Cited in the file of this patent

UNITED STATES PATENTS

| Number | Name | Date |
| --- | --- | --- |
| 1,477,495 | Hutchison | Dec. 11, 1923 |
| 1,839,617 | Tiffany | Jan. 5, 1932 |
| 1,849,385 | Sekulski | Mar. 15, 1932 |
| 2,217,647 | Shield | Oct. 8, 1940 |
| 2,596,686 | Hess | May 13, 1952 |
| 2,604,190 | Meyer | July 22, 1952 |
| 2,633,253 | Martin | Mar. 31, 1953 |

FOREIGN PATENTS

| Number | Country | Date |
| --- | --- | --- |
| 2,450 | Great Britain | June 25, 1877 |
| 151,099 | Switzerland | Mar. 1, 1936 |